United States Patent
Becklin

(10) Patent No.: US 8,172,208 B2
(45) Date of Patent: May 8, 2012

(54) VARIABLE SPRING RATE SHOCK MOUNT HAVING A REPLACEABLE CORE

(75) Inventor: Dennis M. Becklin, Grants Pass, OR (US)

(73) Assignee: Environmental Container Systems, Grants Pass, OR (US)

( * ) Notice: Subject to any disclaimer, the term of this patent is extended or adjusted under 35 U.S.C. 154(b) by 575 days.

(21) Appl. No.: 12/266,467

(22) Filed: Nov. 6, 2008

(65) Prior Publication Data

US 2010/0327500 A1  Dec. 30, 2010

(51) Int. Cl.
*F16F 9/00* (2006.01)

(52) U.S. Cl. ............... 267/140.13; 267/141.4; 296/35.1; 296/35.3; 248/634

(58) Field of Classification Search .......... 188/378–380; 267/140, 152, 153; 206/586–591; 248/621, 248/634–638; 296/35.1, 35.3
See application file for complete search history.

(56) References Cited

U.S. PATENT DOCUMENTS

| | | | | |
|---|---|---|---|---|
| 2,727,738 A | * | 12/1955 | Lindley | 267/153 |
| 2,846,210 A | * | 8/1958 | Carrier, Jr. | 267/153 |
| 2,984,399 A | * | 5/1961 | Gaulke | 206/454 |
| 3,141,660 A | * | 7/1964 | Clarke et al. | 267/166 |
| 3,263,953 A | * | 8/1966 | Shottenfeld et al. | 248/559 |
| 3,268,199 A | * | 8/1966 | Kordyban et al. | 220/632 |
| 3,692,264 A | * | 9/1972 | Burkhard et al. | 248/621 |
| 4,053,148 A | * | 10/1977 | Chalmers | 267/201 |
| 4,114,761 A | * | 9/1978 | Kleiner | 206/591 |
| 4,720,075 A | * | 1/1988 | Peterson et al. | 248/635 |
| 4,887,537 A | * | 12/1989 | Kellogg | 108/55.1 |
| 5,379,990 A | * | 1/1995 | Ando et al. | 267/34 |
| 5,799,930 A | * | 9/1998 | Willett | 267/141.4 |
| 7,264,147 B1 | * | 9/2007 | Benson et al. | 229/199 |
| 2002/0056953 A1 | * | 5/2002 | Williams | 267/140.13 |
| 2002/0113349 A1 | * | 8/2002 | Rivin | 267/140.2 |
| 2006/0108727 A1 | * | 5/2006 | Hees | 267/141.2 |

* cited by examiner

*Primary Examiner* — Christopher Schwartz
(74) *Attorney, Agent, or Firm* — Lowe Graham Jones PLLC

(57) ABSTRACT

A shock mount device for a container includes a variable spring rate assembly coupled to a shock retainer. The variable spring rate assembly is removable from the shock retainer without removing equipment from the container. The variable spring rate assembly includes a replaceable core that may be exchanged with a replaceable core having either a larger or smaller durometer depending on a weight-to-load ration of equipment in the container. Removing and replacing the replaceable core may include removing and replacing the entire variable spring rate assembly.

19 Claims, 3 Drawing Sheets

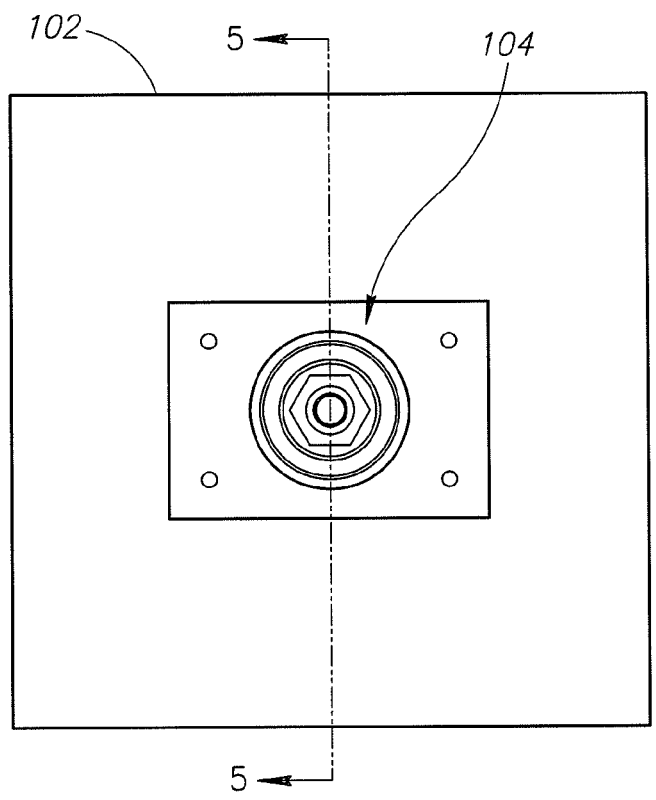
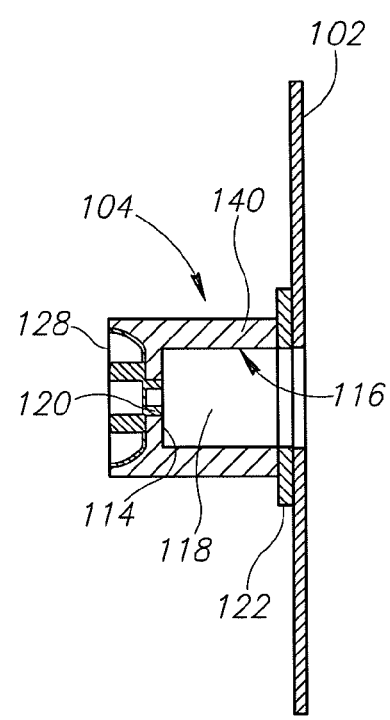
FIG.4
FIG.5

VARIABLE SPRING RATE SHOCK MOUNT HAVING A REPLACEABLE CORE

BACKGROUND OF THE INVENTION

Various types of containers for moving equipment, such as electronics equipment or other types of delicate devices and systems, been employed in military and commercial environments. Because the containers may be moved fairly often during transit, for example on ships, trucks, airplanes and other vehicles, the containers may be subjected to a variety of impact conditions, vibration, and other types of forces and accelerations over their operational life. To support and protect the equipment within the container, conventional shock mount devices with non-adjustable weight-to-load ratios are employed to isolate the equipment within the container and to absorb the inertial loading caused by one or more of the above-described load conditions.

SUMMARY OF THE INVENTION

A shock mount device for a container includes a variable spring rate assembly coupled to a shock retainer. The variable spring rate assembly is removable from the shock retainer without removing equipment from the container. The variable spring rate assembly includes a replaceable core that may be exchanged with a replaceable core having either a larger or smaller durometer depending on a weight-to-load ration of equipment in the container. Removing and replacing the replaceable core may include removing and replacing the entire variable spring rate assembly.

In one example of the invention, a shock mount device for a container includes a shock retainer having a receiving end portion attached to a wall of the container and a closed end portion located distally from the receiving end portion, the shock retainer having an inner surface defining a cavity; and a variable spring rate assembly having a replaceable core receivable within the cavity of the shock retainer, the replaceable core coupled to a coupling member configured to secure the replaceable core to the shock retainer.

In another example of the invention, a shock mount device for a container includes a shock retainer having a receiving end portion coupled to a wall of the container and a closed end portion located distally from the receiving end portion, the shock retainer having an inner surface defining a cavity and further having first and second engagement portions, the first engagement portion located proximate the closed end portion, the second engagement portion located proximate the receiving end portion; and a variable spring rate assembly insertable into the shock retainer, the variable spring rate assembly having a replaceable core located between a first end cap and a second end cap, the variable spring rate assembly engageable with the shock retainer.

In yet another example of the invention, a method for changing a stiffness of a shock mount device for a container includes the steps of (1) removing a variable spring rate assembly from a shock retainer coupled to a wall of the container; and (2) changing a first replaceable core of the variable spring rate assembly with a second replaceable core, the first replaceable core having a spring rate that is different than a spring rate of the second replaceable core.

BRIEF DESCRIPTION OF THE DRAWINGS

In the drawings, identical reference numbers identify similar elements or acts. The sizes and relative positions of elements in the drawings may not be necessarily drawn to scale. For example, the shapes of various elements and angles may not be drawn to scale, and some of these elements may be arbitrarily enlarged or positioned to improve drawing legibility.

The preferred and alternative embodiments of the present invention are described in detail below with reference to the following drawings.

FIG. 4 is a side elevational view of the shock retainer of FIG. 1 coupled to the wall; and FIG. 5 is a cross-sectional view of the shock retainer of FIG. 1 taken along line 5-5 of FIG. 4.

DETAILED DESCRIPTION OF THE PREFERRED EMBODIMENT

In the following description, certain specific details are set forth in order to provide a thorough understanding of various embodiments of the invention. However, one skilled in the art will understand that the invention may be practiced without these details. In other instances, well-known structures associated with equipment containers, shock mount devices with insertable cores and methods of assembling the same have not necessarily been shown or described in detail to avoid unnecessarily obscuring descriptions of the embodiments of the invention.

In addition, throughout the specification and claims which follow, the term "container" is meant as a broad term that includes a variety of structures having an interior space sized to receive a variety of items, such as, but not limited to, electronics, optical, or other equipment that may be otherwise susceptible to damage if not properly packaged in the container. Further, the term "container" as used herein generally may include structurally rigid containers that may be stacked together.

Figure 1:
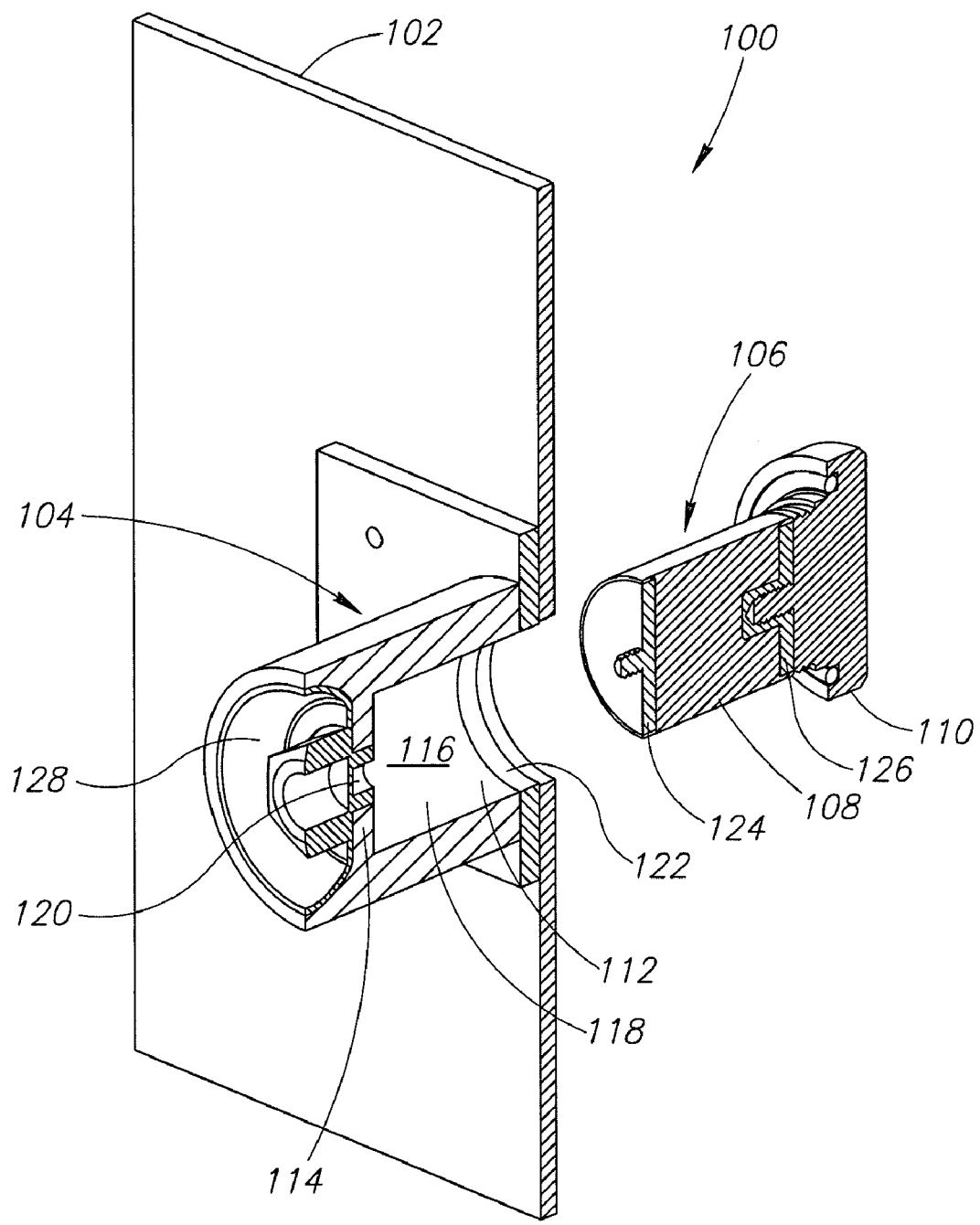
FIG. 1 is an isometric, partially exploded, cross-sectional view of a shock mount device having a shock retainer and a variable spring rate assembly coupled to a wall of a container according to an embodiment of the present invention.

FIG. 1 shows a shock mount device 100 coupled to a wall 102 of a container (not shown). The shock mount device 100 allows adjustment of a weight-to-load ratio without removing equipment from the container. The shock mount device 100 includes a shock retainer 104 and a variable spring rate assembly 106. The shock retainer 104 is coupled to the wall 102 and the variable spring rate assembly 106 is received in the shock retainer 104. The variable spring rate assembly 106 includes a replaceable core 108 coupled to a coupling member 110. The shock retainer 104 includes a receiving end portion 112 distally located from a closed end portion 114 and an inner surface 116 of the shock retainer 104 defines a cavity 118 for receiving at least a portion of the variable spring rate assembly 106. By way of example, when the variable spring rate assembly 106 is received in the shock retainer 104 the coupling member 110 may be threaded into the receiving end portion 112. The coupling member 110 may also take the form of a coupling end cap for securing the variable spring rate assembly 106 and attaching it to the shock retainer 104.

In one embodiment, the shock retainer 104 further includes a first engagement portion 120 and a second engagement portion 122. The first engagement portion 120 may be configured to threadably engage a first end cap 124 of the variable spring rate assembly 106 while the second engagement portion 122 may be configured to threadably engage a second end cap 126 of the variable spring rate assembly 106. In addition, the shock retainer may include a shock retainer end cap 128 coupled to the closed end portion 114.

Figure 2:
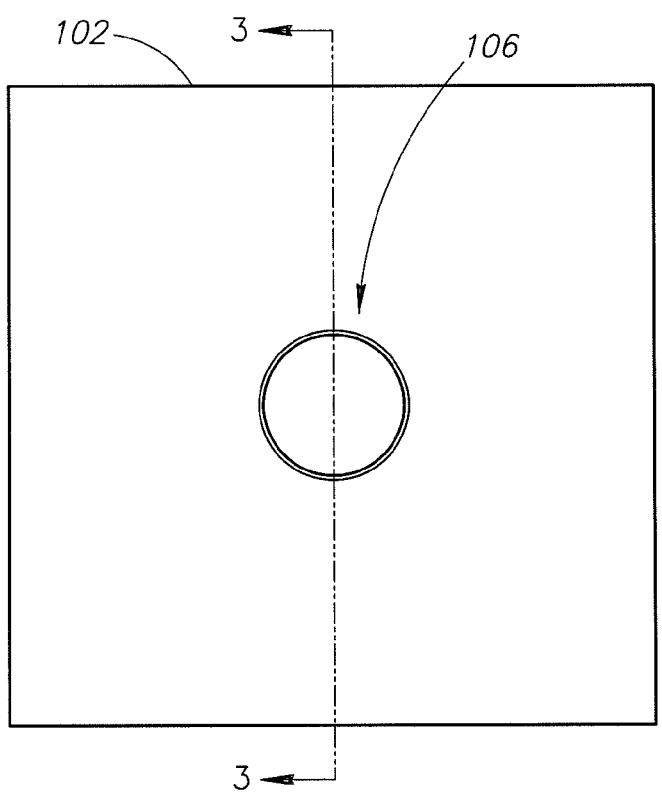
FIG. 2 is a side elevational view of the variable spring rate assembly of FIG. 1 coupled to the wall.
Figure 3:
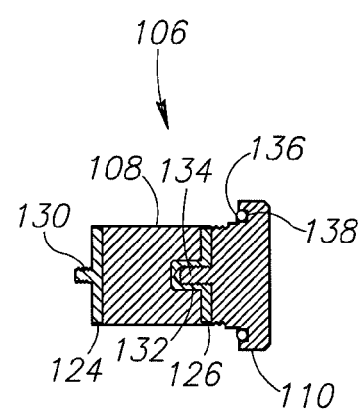
FIG. 3 is a cross-sectional view of the variable spring rate assembly of FIG. 1 taken along line 3-3 of FIG. 2.

FIGS. 2 and 3 show the variable spring rate assembly 106. Specifically, FIG. 2 shows the variable spring rate assembly 106 coupled to the wall 102. Now referring to FIG. 3, the replaceable core 108 is sandwiched between the first and second end caps 124, 126. The first end cap 124 includes a threaded protuberance 130 for threadably engaging the first engagement portion 120 (FIG. 1) of the shock mount retainer 104 (FIG. 1). The second end cap 126 includes a threaded bore 132 configured for threadably engaging a threaded portion 134 of the coupling member 110. A sealing member 136, such as an o-ring seal, may be placed in a recess 138 of the coupling member 110. The replaceable core 108 may be an elastomeric core having an appropriate size to be received between the end caps 124, 126 and further be received into the shock retainer 104. The replaceable core 108 may have a selected durometer to meet a predetermined weight-to-load ratio of the equipment in the container. If equipment is added or removed or if the loading on the container is expected to be different, the replaceable core 108 may be removed and replaced with another replaceable core 108 having a different durometer without removing the equipment from the container.

Briefly referring back to FIG. 1, the variable spring rate assembly 106 may be de-coupled or otherwise unscrewed from the shock retainer 104. Then the coupling member 110 and end caps 124, 126 may be removed and a new, replaceable core 108 inserted between the end caps 124, 126. In another embodiment, an inventory of variable spring rate assemblies 106 may be available such that the entire variable spring rate assembly 106 may be simply removed and replaced to achieve a shock mount device 100 having different shock absorbent characteristics. Thus, the replaceable core 108 or the variable spring rate assembly 106 in its entirety may be changed based the weight of equipment placed in the container.

FIGS. 4 and 5 show the shock retainer 104 coupled to the wall 102 of the container (not shown). For purposed of clarity, it is understood that the shock retainer 104 extends into the container while the variable spring rate assembly 106 is accessible from outside of the container. In one embodiment, a wall 140 of the shock retainer 104 is made from an elastomeric material having a selected durometer. The elastomeric material forming the wall 140 may have the same durometer as the replaceable core 108 or may have a significantly different durometer. The cavity 118 formed by the inner surface 116 of the wall 140 is configured to receive replaceable cores 108 having a variety of durometers (e.g., spring rates).

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A shock mount device for a container comprising:
    a shock retainer located within the container, the shock retainer having a receiving end portion attached to a wall of the container and a closed end portion located distally from the receiving end portion, the shock retainer having an inner surface defining a cavity;
    a variable spring rate assembly having a replaceable core receivable within the cavity of the shock retainer, wherein the cavity in the shock retainer is configured to permit the variable spring rate assembly to be placed into the cavity and removed from the cavity from the exterior of the container with the shock retainer attached to the wall of the container, the replaceable core coupled to a coupling member configured to secure the replaceable core to the shock retainer.

2. The shock mount device of claim 1, wherein the coupling member is threadably engageable with the shock retainer.

3. The shock mount device of claim 1, wherein the replaceable core is a solid body made from an elastomeric material having a selected durometer.

4. The shock mount device of claim 1, wherein at least a portion of the shock retainer located between the receiving end portion and the closed end portion is made from an elastomeric material.

5. The shock mount device of claim 1, wherein the variable spring rate assembly is removable from the shock retainer to replace at least the replaceable core without removing items from the container.

6. A shock mount device for a container comprising:
    a shock retainer located within the container, the shock retainer having a receiving end portion coupled to a wall of the container and a closed end portion located distally from the receiving end portion, the shock retainer having an inner surface defining a cavity and further having first and second engagement portions, the first engagement portion located proximate the closed end portion, the second engagement portion located proximate the receiving end portion; and
    a variable spring rate assembly insertable into the shock retainer, wherein the cavity of the shock retainer is configured to permit the variable spring rate assembly to be inserted into and removed from the cavity from the exterior of the container while the receiving end portion is coupled to the wall of the container, the variable spring rate assembly having a replaceable core located between a first end cap and a second end cap, the variable spring rate assembly engageable with the shock retainer, and wherein the variable spring rate assembly has first and second engagement portions configured to engage the first and second engagement portions of the shock retainer, respectively.

7. The shock mount device of claim 6, wherein the first end cap is engageable with the first engagement portion of the shock retainer.

8. The shock mount device of claim 6, further comprising a coupling member for securing the variable spring rate assembly to the wall of the container.

9. The shock mount device of claim 8, wherein the second end cap is threadably engageable with the coupling member.

10. The shock mount device of claim 8, wherein the coupling member includes a first portion engageable with the second end cap of the variable spring rate assembly and a second portion engageable with the wall of the container.

11. The shock mount device of claim 10, wherein the first engagement portion is threadably engageable with the second end cap of the variable spring rate assembly.

12. The shock mount device of claim 10, wherein the second engagement portion is threadably engageable with the wall of the container.

13. The shock mount device of claim 6, wherein the replaceable core is a solid body made from an elastomeric material having a selected durometer.

14. The shock mount device of claim 6, wherein at least a portion of the shock retainer located between the receiving end portion and the closed end portion is made from an elastomeric material.

15. The shock mount device of claim 6, wherein the shock retainer includes a shock retainer end cap positioned adjacent the closed end portion of the shock retainer, the shock retainer end cap including the first engagement portion.

16. The shock mount device of claim 6, wherein the replaceable core includes a spring rate that is changeable based on an amount of weight within the container.

17. A method for changing a stiffness of a shock mount device for a container, the method comprising:

removing a variable spring rate assembly from a shock retainer coupled to an interior wall of the container; and changing a first replaceable core of the variable spring rate assembly with a second replaceable core from the exterior of the container while the shock retainer remains coupled to the interior wall of the container, the first replaceable core having a spring rate that is different than a spring rate of the second replaceable core.

18. The method of claim 17, wherein removing the variable spring rate assembly includes unthreading a coupling member of the variable spring rate assembly from the shock retainer.

19. The method of claim 17, wherein changing the first replaceable core with the second replaceable core includes removing and replacing the variable spring rate assembly.

\* \* \* \* \*